(12) United States Patent
Donnelly et al.

(10) Patent No.: US 9,902,405 B2
(45) Date of Patent: Feb. 27, 2018

(54) RAIL CARS FOR TRANSPORTING HEAVY HYDROCARBONS

(71) Applicants: Frank Wegner Donnelly, North Vancouver (CA); John D. Watson, Evergreen, CO (US)

(72) Inventors: Frank Wegner Donnelly, North Vancouver (CA); John D. Watson, Evergreen, CO (US)

(73) Assignee: Tractivepower Corporation, North Vancouver, BC (CA)

( * ) Notice: Subject to any disclaimer, the term of this patent is extended or adjusted under 35 U.S.C. 154(b) by 590 days.

(21) Appl. No.: 14/151,520

(22) Filed: Jan. 9, 2014

(65) Prior Publication Data
US 2014/0193761 A1    Jul. 10, 2014

Related U.S. Application Data

(60) Provisional application No. 61/750,629, filed on Jan. 9, 2013.

(51) Int. Cl.
*F24H 9/20* (2006.01)
*B61C 5/00* (2006.01)
(Continued)

(52) U.S. Cl.
CPC ............... *B61C 5/00* (2013.01); *B61C 17/02* (2013.01); *B61C 17/08* (2013.01); *Y02T 30/10* (2013.01)

(58) Field of Classification Search
CPC ........................................................ F24H 9/20
See application file for complete search history.

(56) References Cited

U.S. PATENT DOCUMENTS

| 2,083,768 A * | 6/1937 | Zook ................. B61D 27/0018 165/119 |
| 3,286,079 A | 11/1966 | Hynes et al. |

(Continued)

OTHER PUBLICATIONS

"Powder River Basin," Wikipedia, the free encyclopedia, Mar. 28, 2014, [retrieved on Apr. 22, 2014], 7 pages. Retrieved from: http://en.wikipedia.org/wiki/Powder_River_Basin.

(Continued)

*Primary Examiner* — Nathaniel Herzfeld
(74) *Attorney, Agent, or Firm* — Sheridan Ross P.C.

(57) ABSTRACT

A method and system of temperature control of heavy hydrocarbons in a consist of rail cars is disclosed wherein waste heat from one or more of the locomotives propelling the train is utilized to heat the heavy hydrocarbons in a consist or ambient air is used to cool the heavy hydrocarbon cargo. The train is typically comprised of tanker cars that can be filled with raw heavy hydrocarbon, not dilbit thus allowing about 20% to about 30% additional heavy hydrocarbon to be transported in each tanker car. The system can keep the heavy hydrocarbon at a first, lower temperature en route and increase temperature to a second higher temperature as the train nears its terminus so that the tanker cars can be quickly emptied of their contents at the receiving terminal without the need to heat the tanker cars at the unloading terminal. The method disclosed herein for heating tanker cars in transit is to utilize waste heat from the locomotive diesel or gas turbine engines which is otherwise exhausted to the atmosphere.

20 Claims, 10 Drawing Sheets

(51) Int. Cl.
*B61C 17/02* (2006.01)
*B61C 17/08* (2006.01)

(56) References Cited

U.S. PATENT DOCUMENTS

| | | | | |
|---|---|---|---|---|
| 3,359,971 | A * | 12/1967 | Snelling | B60P 3/2295 126/343.5 A |
| 3,372,693 | A | 3/1968 | Gutzeit | |
| 3,681,566 | A * | 8/1972 | Sellers | F24H 1/46 126/343.5 A |
| 4,028,527 | A * | 6/1977 | Thagard, Jr. | C10C 3/12 126/343.5 A |
| 4,342,921 | A * | 8/1982 | Williams | B60L 7/10 290/2 |
| 4,414,462 | A * | 11/1983 | Price | B61D 5/02 105/358 |
| 4,415,018 | A * | 11/1983 | Rosenberger | F28D 1/0213 105/451 |
| 4,462,547 | A * | 7/1984 | Metz | E01C 23/166 165/146 |
| 5,320,161 | A * | 6/1994 | Iiams | A01N 35/02 126/343.5 A |
| 2006/0257127 | A1* | 11/2006 | Patterson | F24H 9/2021 392/441 |
| 2009/0113913 | A1* | 5/2009 | Esaki | B60H 1/323 62/239 |
| 2010/0276140 | A1 | 11/2010 | Edmunds et al. | |
| 2013/0197827 | A1* | 8/2013 | Besore | G06Q 50/06 702/45 |
| 2015/0344044 | A1* | 12/2015 | Yuasa | B60H 1/00742 165/11.1 |

OTHER PUBLICATIONS

"TankTrain," Alaskarails.org, 2012, [retrieved on Apr. 22, 2014], 3 pages. Retrieved from: www.alaskarails.org/fp/TankTrain.html.
Lustig, "Hot seat on the Oil Cans," Trains, Aug. 1994, pp. 34-41.

* cited by examiner

RAIL CARS FOR TRANSPORTING HEAVY HYDROCARBONS

CROSS REFERENCE TO RELATED APPLICATION

The present application claims the benefits, under 35 U.S.C. § 119(e), of U.S. Provisional Application Ser. No. 61/750,629 entitled "Rail Cars for Transporting Heavy Hydrocarbons" filed Jan. 9, 2013, which is incorporated herein by reference.

FIELD

The present disclosure relates generally to a method of temperature control of heavy hydrocarbons in a rail car and specifically to using waste heat from one or more locomotives to heat the heavy hydrocarbons.

BACKGROUND

Heavy oil and bitumen (herein also referred to as heavy hydrocarbons) are commonly moved by pipeline from the well head to a terminus which may be, for example, a refinery or a shipping port. To facilitate flow in the pipeline, a diluent is typically added to produce a hydrocarbon mixture with a viscosity suitable for pipeline transport. An advantage of pipeline transport is the relatively low cost of transport once the pipeline is installed. Disadvantages of pipeline transport are the problems of obtaining right-of-way and the initial cost of installation.

Recently, there has been interest in moving heavy hydrocarbons from the well head to a terminus by rail in special tanker cars. If moved by rail, the heavy hydrocarbon must either be heated or a diluent added to lower the viscosity so that it can be pumped in and out of the tanker cars. An advantage of rail transport is the use of pre-existing rail lines and the relatively low initial costs of acquiring special tanker cars. A disadvantage of rail transport is the somewhat higher operational cost of transport compared to pipeline transport. However this latter disadvantage can be reduced by moving heated heavy hydrocarbons rather than heavy hydrocarbons mobilized by a diluent. When a diluent is used, the volume of diluent is in the range of about 20% to about 30% of the tanker car volume, thus reducing the volume of heavy hydrocarbon that can be moved. Another disadvantage of transporting dilbit by rail is that the dilbit is liquid with a viscosity not much higher than water at outside ambient temperature. Therefore, in the event of a train derailment and rupture of some or all of the tanker cars, the spill of dibit remains liquid and must be treated as a major oil spill In pipeline transport or rail transport using diluents, net loss of diluent is an important economic consideration since the cost per barrel of diluent is several times the cost per barrel of unrefined heavy hydrocarbon.

As described in U.S. Pat. No. 3,286,079, U.S. Pat. No. 3,372,693 and U.S. Pat. No. 4,414,462, for example, methods of transporting heated bitumen or heavy oil are known. In U.S. Pat. No. 3,286,079, a method of heating heavy hydrocarbons by resistance heaters on each car is disclosed. In U.S. Pat. No. 3,372,693, a method of heating heavy hydrocarbons by a flameless combustion heater on each car is disclosed. In U.S. Pat. No. 4,414,462, a heated railway tanker car is disclosed that includes heating conduits arranged on the tank, filled with a heating fluid and coupled to an electrically driven pump and heat exchanger in a closed-loop system for heating and continuously recirculating the heating fluid through the conduit. The tanker car is adapted to be electrically interconnected with adjacent cars and the electric power may be provided from the locomotive, from an axle generator and alternator combination on the tanker car, or from rechargeable batteries on the tanker car charged by either terminal facilities or axle-mounted or locomotive-mounted generator means. All of these prior art methods of heating heavy hydrocarbons and maintaining them within a desired temperature range require additional electrical or mechanical power supplied either by the locomotive or an auxiliary power unit.

There remains a need for a method of temperature control of heavy hydrocarbons in a consist of rail cars that does not require additional power from the locomotives or auxiliary power units for heating or cooling so that transport of hydrocarbon by rail can be practiced safely and at a per-barrel cost approaching that of pipeline transport.

SUMMARY

These and other needs are addressed in the present disclosure. The various embodiments and configurations of the present disclosure. are directed generally to a method of temperature control of heavy hydrocarbons in a consist of rail cars and specifically to either using waste heat from one or more of the locomotives propelling the train to heat the heavy hydrocarbons in the consist or using ambient air to help cool the heavy hydrocarbons in the consist.

A train, according to the present disclosure can have heated tanker cars that can be filled with raw bitumen or heavy oil, not dilbit, and that can maintain the raw bitumen or heavy oil heated and mobilized en route so that at the receiving terminal, the tanker cars can be quickly emptied of their contents without the need of, or in the substantial absence of, heating of the tanker cars at the unloading terminal. Heating of the tanker cars and contents at the terminus can cause delays in the cars discharging of the hydrocarbon product and would add capital and operational expense at the receiving terminal, thus adversely affecting the operating economics of transporting bitumen or heavy oil by rail.

If bitumen or heavy oil is transported without diluent but in a heated condition, its temperature can be controlled allowing it to be transported as either a solid (in the case of bitumen) or as a liquid just above its freezing point. Therefore, in the event of a train derailment and rupture of some or all of the tanker cars, the bitumen, for example, will soon freeze and become solid or semi-solid, depending on ambient temperature. Although it may be classed as an oil spill, it will be much easier to clean up as it will be a solid or at worst a very viscous material that will not disperse rapidly as would a high temperature heavy hydrocarbon or dilbit.

Heating of tanker cars and their heavy hydrocarbon cargo can be accomplished using one of several different ways. Methods of heating of tanker cars that could be done while in transit have been described in the prior art as set forth in the Background. The method disclosed herein for temperature control (heating or cooling the hydrocarbon) tanker cars in transit can utilize waste heat from the locomotive's engine for increasing hydrocarbon temperature or ambient air for decreasing hydrocarbon temperature.

Thermal energy from the locomotive's diesel or gas turbine engines is normally rejected as hot exhaust. Other sources of heat from the engine could also be used as well such as waste heat captured from the cooling jacket and oil cooler. However the temperature from these sources may be insufficient for heating the bitumen to a desired viscosity to provide a satisfactory flow capability. Additionally engines other than diesel or gas turbine engines may be considered as locomotive prime movers and thermal energy sources for heating the tanker cars. For example, spark-ignition gas engines could be used. The concept disclosed herein typically utilizes the waste heat or exhaust gases generated by the engines of the locomotive or locomotives propelling the train to heat the heavy hydrocarbon in special tanker cars. This thermal energy is transferred to a heat transfer fluid in a heat exchanger and routed through conduits to heat the tanker cars. As will be described below, the same heat exchanger and heat transfer fluid/circulation system can be used for cooling the heavy hydrocarbon cargo by deselecting the hot engine exhaust gases and selecting ambient air as the input to the main locomotive heat exchanger.

Capturing thermal energy from the locomotive exhaust and directing this heat energy to tanker cars within the train can be done with heat exchangers that are in a circuit of circulating heat exchange fluid. This circulating fluid that moves thermal energy from the locomotive hot exhaust to the tanker cars may be, for example, water, water and propylene glycol or other antifreeze solutions. The heat transfer fluid may also be oil or steam with returning condensate or an existing product such as DOWTHERM. Other heat exchange media will be appreciated by those of ordinary skill in the art.

A pump on the locomotive may supply the power to move the fluid around the circuit and through the heat exchangers. The pump may be powered from an auxiliary power source on the locomotive. The heat exchanger on the locomotive would be in the flow of the hot exhaust gas removing thermal energy from the gas, thus cooling the engine exhaust gas prior to release into the atmosphere, and transferring the thermal energy into the fluid flowing in the heat exchanger, thus heating the fluid. Preferably, the heat exchanger would be configured as a counter-flow type. The heat exchangers on the tanker cars are a standard feature on tanker cars that are insulated and designed to carry liquids at elevated temperatures. These heat exchangers are constructed from sinuous pipe that is either attached to the outer surface of the tank, under the tank's insulation, transferring heat by conduction through the shell of the tank into the liquid lading, or the heat exchanger itself is in the tank, immersed in the liquid lading, transferring heat directly into it. The connections that form the circuit between the heat exchangers and pump would be pipe and flexible hose. Rigid pipe would run along the tanker cars and locomotive joined with flexible hose between the tanker cars and locomotive carrying the heat transferring fluid. Connections to the car heat exchangers may be made on each tanker car with a temperature control system for controlling the temperature of the heavy hydrocarbon in the tanker cars and rationing the thermal energy resource from the locomotive between all of the cars in the heating circuit.

The same locomotive heat exchanger, heat transfer fluid and flow circuit and the same tanker car heat exchange and control circuits as those used in maintaining or increasing the temperature of the heavy hydrocarbon can be used to remove heat and lower the temperature of the hydrocarbons in the tanker cars. This can be accomplished by use of a flow switch apparatus that can switch the heat transfer input fluid from hot engine exhaust gases to cool ambient air.

The system described above can also include an automatic controller that receives inputs comprising data from a GPS system and from the locomotives and heated tanker cars. The controller can automatically maintain the heated heavy hydrocarbons at a selected low temperature during much of the route to the terminus and then, as the train nears the terminus, increase the heavy hydrocarbons temperature to a suitable level for delivery by pumping at the terminus. By maintaining the heated heavy hydrocarbons at a selected low temperature during much of the route to the terminus, the heavy hydrocarbons is maintained at a state near its "freezing" point making it less likely to cause harm in the event of a derailment.

In one embodiment, a method is disclosed comprising controlling a temperature of a hydrocarbon contained in one or more container volumes during transport using at least one of an engine exhaust gas provided by an engine causing the transport of the one or more container volumes and ambient air to exchange thermal energy with a heat exchange fluid contacting the one or more container volumes, whereby the temperature of the hydrocarbon in the one or more container volumes is maintained at a selected temperature during transport. The engine exhaust gas and the heat exchange fluid raise the temperature of the hydrocarbon contained in the one or more container volumes and ambient air and the heat exchange fluid air lowers the temperature of the hydrocarbon contained in the one or more container volumes. The temperature of the hydrocarbon contained in the one or more container volumes is maintained by an automatic controller configured to manipulate a control valve to contact selectively the heat exchange fluid with at least one of the one or more container volumes and hydrocarbon. The one or more container volumes are each railway tanker cars and the engine is in a locomotive connected to the one or more container volumes. The at least one of the engine exhaust gas and ambient air is in fluid communication with a locomotive heat exchanger through which the heat exchange fluid flows. The one or more container volumes comprise a conduit for the heat exchange fluid, wherein the one or more container volumes comprise multiple tanker cars, and wherein the conduit extends from one tanker car to an adjacent tanker car. Each of the railway tanker cars comprises a tanker car heat exchanger and a heat transfer control valve and wherein the tanker car heat exchanger is selectively contacted with the heat exchange fluid, whereby the hydrocarbon is heated and cooled, respectively, by thermal contact with the heat exchange fluid. One of water, water and propylene glycol and DOWTHERM is the heat exchange fluid and the heat exchange fluid is in thermal communication with a locomotive heat exchanger on a railway locomotive and is routed through one or more conduits to the one or more container volumes to raise or maintain a user-selected temperature of the hydrocarbon in the one or more container volumes. While the hydrocarbon is stored in the one or more container volumes, the one or more container volumes is substantially free of diluents.

In another embodiment, a system for controlling a temperature of a hydrocarbon during transport is disclosed comprising 1) a hydrocarbon contained in one or more container volumes configured for transport and 2) an engine causing the transport of the one or more container volumes, the engine producing an engine exhaust gas; whereby the temperature of the hydrocarbon is maintained during transport at a selected temperature using at least one of an engine exhaust gas provided by an engine causing the transport of the one or more container volumes and ambient air to exchange thermal energy with a heat exchange fluid in thermal communication with the one or more container volumes. The engine exhaust gas and the heat exchange fluid raise the temperature of the hydrocarbon contained in the one or more container volumes and ambient air and the heat exchange fluid lowers the temperature of the hydrocarbon contained in the one or more container volumes. The temperature of the hydrocarbon contained in the one or more container volumes is maintained by an automatic controller configured to manipulate a control valve to contact selectively the heat exchange fluid with at least one of the one or more container volumes and hydrocarbon. The one or more container volumes are each railway tanker cars and the engine is in a locomotive connected to the one or more container volumes. The at least one of the engine exhaust gas and ambient air is in fluid communication with a locomotive heat exchanger through which the heat exchange fluid flows. The one or more container volumes comprise a conduit for the heat exchange fluid, wherein the one or more container volumes comprise multiple tanker cars, and wherein the conduit is extends from one tanker car to an adjacent tanker car. Each of the railway tanker cars comprises a tanker car heat exchanger and a heat transfer control valve and the tanker car heat exchanger is selectively contacted with the heat exchange fluid, whereby the hydrocarbon is heated and cooled, respectively, by thermal contact with the heat exchange fluid. The one or more container volumes are each railway tanker cars and wherein the engine is in a locomotive connected to the one or more container volumes; wherein one of water, water and propylene glycol and DOWTHERM is the heat exchange fluid, and wherein the heat exchange fluid is in thermal communication with the locomotive heat exchanger of the railway locomotive and is routed through one or more conduits to the one or more container volumes to raise or maintain a user-selected temperature of the hydrocarbon in the one or more container volumes. The one or more container volumes is substantially free of diluents.

In another embodiment, a method is disclosed comprising 1) receiving, from a sensor in thermal communication with a selected container volume containing a hydrocarbon, a first sensed temperature and 2) comparing, by a microprocessor, the first sensed temperature with at least one of a prior second sensed temperature of the selected container volume, a sensed temperature of another container volume, a temperature threshold, and a look up table of sensed temperatures; and based on the comparing step, 3) contacting at least one of an engine exhaust gas from an engine transporting the container volume and ambient air with a locomotive heat exchanger to exchange thermal energy with a heat exchange fluid to adjust a temperature of the container volume. The contacting step comprises the sub-step of selecting a setting of a control valve in fluid communication with the heat exchange fluid to contact selectively the heat exchange fluid with at least one of the one or more container volumes. The method further comprising, at a later time, receiving, from the sensor a third sensed temperature of the container volume, wherein the third sensed temperature is higher than the first sensed temperature; comparing, by the microprocessor, the third sensed temperature with at least one of the first sensed temperature, a temperature threshold, and a look up table of sensed temperatures and based on the comparing step, no longer contacting the heat exchange fluid with the container volume to adjust a temperature of the container volume. In response to comparing the third sensed temperature with the at least one of the first sensed temperature, temperature threshold, and look up table, contacting the heat exchange fluid with at least one of the container volumes to reduce a temperature of the container volume and wherein no longer contacting comprises discharging the engine exhaust gas into an ambient atmosphere. The microprocessor receives, from a different sensor in thermal communication with a different container volume containing a hydrocarbon, a third sensed temperature; compares the third sensed temperature with the first sensed temperature of the selected container volume; and, based on the comparing step, contacts the heat exchange fluid with the different container volume and not the selected container volume to adjust a temperature of the different container volume. The selected and different container volumes have differing amounts of hydrocarbon, differing materials of construction, different stored hydrocarbon compositions, and/or different spatial locations, whereby the selected and different container volumes have differing cooling and/or heating rates. The microprocessor receives, substantially simultaneously, different sensed temperatures from differing hydrocarbon-containing container volumes and selects a sub-set of the container volumes to be heated or cooled by the heat exchange fluid, wherein the container volumes include the selected and a different container volume, and wherein the engine transports all of the container volumes.

In another embodiment, a method is disclosed comprising determining, by a microprocessor, an approximate spatial location of a one or more container volumes containing a hydrocarbon; and in response to the determined spatial location and based on a set of rules, the microprocessor causing heating and/or cooling of the hydrocarbon. The determined spatial location is relative to a terminus where the hydrocarbon will be unloaded from the one or more container volumes. When the determined spatial location is near the terminus, the hydrocarbon is heated and, when the determined spatial location is not near the terminus, the hydrocarbon is not heated. When the determined spatial location is distant from the terminus, the temperature of the hydrocarbon is maintained at a first temperature and, when the spatial location is near the terminus, the hydrocarbon temperature is maintained at a second temperature and wherein the first temperature is less than the second temperature.

The above-described embodiments and configurations are neither complete nor exhaustive. As will be appreciated, other embodiments of the disclosure are possible utilizing, alone or in combination, one or more of the features set forth above or described in detail below. These and other advantages will be apparent from the disclosure of the disclosure(s) contained herein.

The phrases at least one, one or more, and/or are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The following definitions are used herein:

An A-unit is a locomotive with an engine, transmission and drive axles and is typically a lead locomotive in a consist. It is controlled by the crew of the locomotive.

The term automatic and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A B-unit is a locomotive with an engine, transmission and drive axles but without a functional cab. A B-unit is typically controlled remotely by the crew of the lead locomotive or A-unit.

A burden car is a single car that carries cargo and provides its own propulsion.

A cabless locomotive is a locomotive not having a functional operator's enclosure or cab. In a functional operator's cab, the locomotive may be operated with protection from outside weather, noise and fumes. In a functional operator's cab, the operator has available at least throttle controls, braking controls and locomotive status displays. A cabless locomotive may not have an operator's cab or it may have the cab windows blacked out and the door locked to render the cab unuseable.

The term computer-readable medium as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A consist as used herein is a group of rail vehicles making up a train. It has also been used to mean a group of locomotives connected together and operating as a unit for Multiple-Unit (MU) operation. A consist as used herein is a lineup or sequence of railroad cars, with or without a locomotive, that form a unit. In the United States, the term consist is used to describe the group of rail vehicles which make up a train. When referring to motive power, a consist can refer to the group of locomotives powering the train.

Dilbit is short for diluted bitumen. Typically, dilbit is about 65% bitumen diluted with about 35% naphtha. The naphtha is added to make a fluid that can be transported by pipeline by reducing the viscosity of the bitumen/naphtha mixture. The dilbit can be transported by pipeline to a refinery. The naphtha diluent can be taken out as a straight run naphtha/gasoline and reused as diluent. Or it can be processed to create products in the refinery. The dilbit has a lot of light hydrocarbons from the diluent and a lot of heavy hydrocarbons from the bitumen. So it is a challenge to process directly in a normal refinery. Dilbit can only be a small part of a normal refinery's total crude slate. In addition to naphtha, condensate can also be used as diluent.

A diluent as used herein is a light hydrocarbon that both dilutes and partially dissolves in heavy hydrocarbons. In a thermal or non-thermal heavy oil or bitumen production method, a solvent liquid or vapor is used to reduce viscosity of the heavy oil. An injected solvent vapor expands and dilutes the heavy oil by contact. The diluted heavy oil is then produced via horizontal or vertical producer wells. Diluent and solvent are often used interchangeably in the production of heavy oil and bitumen.

Dynamic braking is typically implemented when the electric propulsion motors are switched to generator mode during braking to augment the braking force. The electrical energy generated is typically dissipated in a resistance grid system. Dynamic braking can also be accomplished using pneumatics or hydraulics.

An energy storage system refers to any apparatus that acquires, stores and distributes mechanical or electrical energy which is produced from another energy source such as a prime energy source, a regenerative braking system, a third rail and an overhead wire and any external source of electrical energy. Examples are a battery pack, a bank of capacitors, a compressed air storage system and a bank of flywheels.

An engine refers to any device that uses energy to develop mechanical power, such as motion in some other machine. Examples are diesel engines, gas turbine engines, microturbines, Stirling engines and spark ignition engines.

A locomotive is commonly a diesel electric or gas turbine railroad prime mover which includes an engine, generator, and traction motors.

A mobilized hydrocarbon is a hydrocarbon that has been made flowable by some means. For example, some heavy oils and bitumen may be mobilized by heating them or mixing them with a solvent to reduce their viscosities and allow them to flow under the prevailing drive pressure. Most liquid hydrocarbons may be mobilized by increasing the drive pressure on them, for example by water or gas floods, so that they can overcome interfacial and/or surface tensions and begin to flow.

A mobilizing agent as used herein is at least one of steam and a solvent.

A prime power source refers to any device that uses energy to develop mechanical or electrical power, such as motion in some other machine. Examples are diesel engines, gas turbine engines, microturbines, Stirling engines, spark ignition engines or fuel cells.

Regenerative braking is the same as dynamic braking except the electrical energy generated is recaptured and stored for future use in an energy storage system.

A slug is a ballasted, typically four or six axle unit that does not have a prime mover, but does have traction motors.

Synbit is a blend of bitumen and synthetic crude. Synthetic crude is a crude oil product produced, for example, by the upgrading and refining of bitumen or heavy oil. Typically, Synbit is about 50% bitumen diluted with about 50% synthetic crude.

A traction motor is a motor used primarily for propulsion such as commonly used in a locomotive. Examples are an AC or DC induction motor, a permanent magnet motor and a switched reluctance motor.

Tractive effort is the force applied by the driving wheels parallel to the track. Tractive effort is a synonym of tractive force, typically used in railway engineering terminology when describing the pulling power of a locomotive. The tractive effort provided by a particular locomotive varies depending on speed and track conditions, and is influenced by a number of other factors.

A tender is an auxiliary rail car that stores supplies such as fuel or water for use by a locomotive or locomotive consist.

Upgrading (including partial upgrading) as used herein means removing carbon atoms from a hydrocarbon fuel, replacing the removed carbon atoms with hydrogen atoms to produce an upgraded fuel and then combining the carbon atoms with oxygen atoms to form carbon dioxide.

It is to be understood that a reference to solvent herein is intended to include diluent and a reference to diluent herein is intended to include solvent. It is also to be understood that a reference to dilbit also includes other blends of heavy and light hydrocarbons such, as for example, synbit.

It is also to be understood that a reference to tank cars is the same as a reference to tanker cars.

It is to be also understood that a reference to oil herein is intended to include low API hydrocarbons such as bitumen (API less than ~10°) and heavy crude oils (API from ~10° to ~20°) as well as higher API hydrocarbons such as medium crude oils (API from ~20° to ~35°) and light crude oils (API higher than ~35°). A reference to bitumen is also taken to mean a reference to low API heavy oils. A reference to heavy hydrocarbons is taken to mean low API hydrocarbons such as bitumen (API less than ~10°) and heavy crude oils (API from ||10° to ~20°).

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure may take form in various components and arrangements of components, and in various steps and arrangements of steps. The drawings are only for purposes of illustrating the preferred embodiments and are not to be construed as limiting the disclosure.

Figure 1:
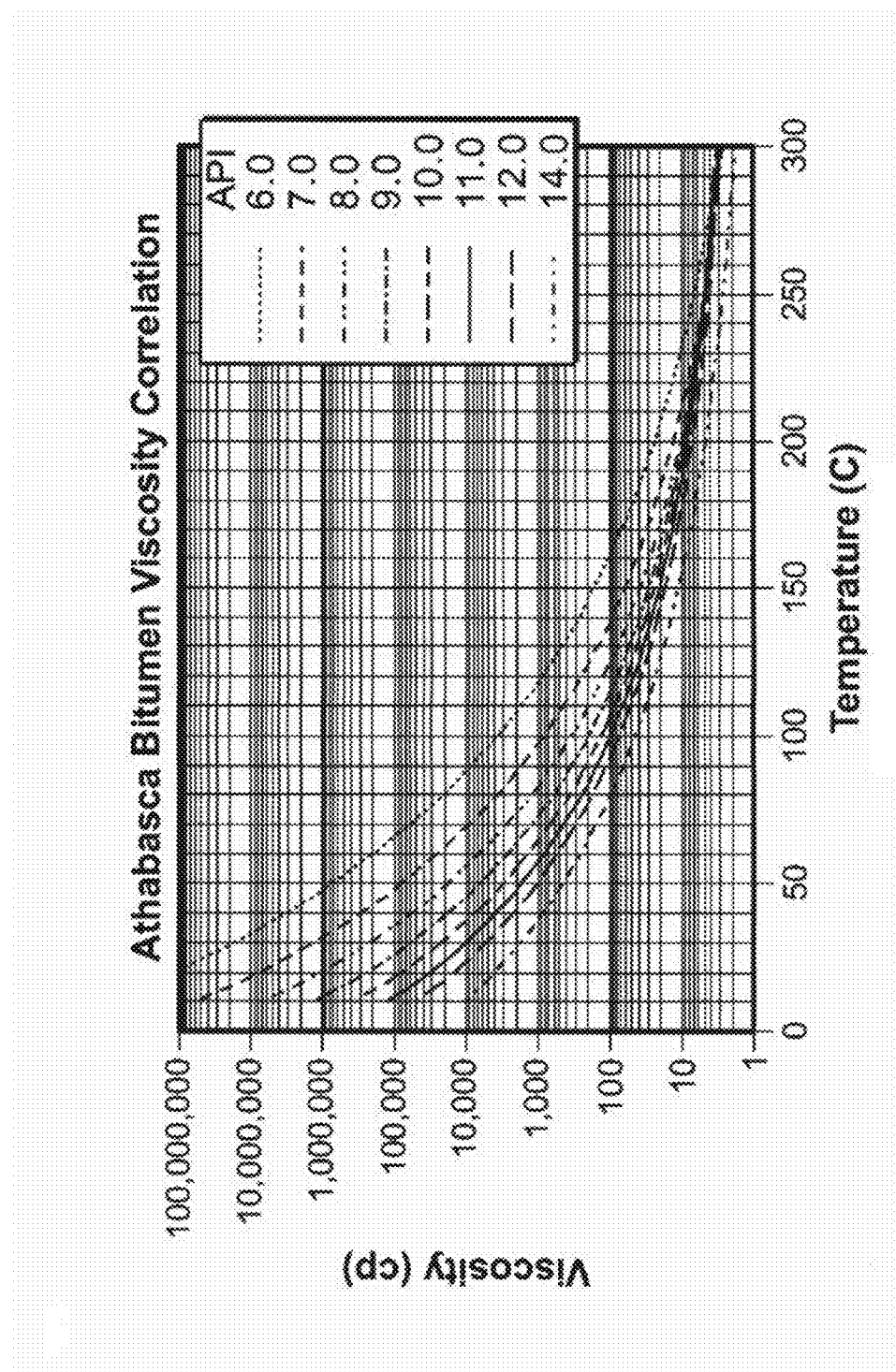
FIG. 1 is a graph of bitumen viscosity as a function of temperature.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Unit trains for bulk transport are well-known. Unit trains are used to transport bulk materials such as grain, crude oil, coal, chemicals and the like. For example, unit coal trains operate out of Wyoming's Powder River Basin daily. Typically, more than 80 unit trains of coal, each unit train varying in size from about 115 to about 150 cars, have been dispatched from the Powder River Basin each day. In 2006, Union Pacific hauled 194 million tons of coal from the Powder River Basin. This was achieved by unit trains averaging more than 15,000 tons each. Each train was comprised of approximately 125 cars and each car holds about 120 tons of coal. These unit trains average about 115 to about 150 cars long and stretch for about a mile and a half (source: http://en.wikipedia.org/wiki/Powder River Basin).

Unit oil trains are also well known. A heavy oil train operating in Southern California is described in "Trains" magazine, August 1994, pages 34-41. Heavy oil was loaded in tanker cars and transported in a heated condition from Bakersfield Calif. to Carson Calif. The train, nicknamed the Oil Can Train, is comprised of typically 9 Special Duty (SD 40) locomotives and about 77 or 78 tanker cars wherein each car transports about 23,130 gallons per car (550 bbls per car). Thus a 78 car train can transport almost 43,000 barrels of heavy crude.

An oil train, also known as the Tank Train, also operated in Alaska. This system of interconnecting tanker cars provides a rapid method of moving large volumes of bulk liquids such as crude oil. The Tank Train system consists of an entire string of cars that can be loaded or unloaded from a single system connection. The last car in each set of 12 cars is left ¾ full. Then nitrogen gas is used to purge the loading lines of any remaining oil which thereupon fills the last car. The capacity per tanker car is given as 23,000 gallons (550 bbls) which is an approximate amount (source: http://www.alaskarails.org/fp/TankTrain.html).

The key features of this system are: single-point loading and unloading resulting in lower costs: faster loading and unloading rates which decrease turnaround time; and interconnected railcars which means more effective vapor collection and reduced chance of spillage.

The Tank Train system was first tested by the Alaska Railroad. The cars had to be kept turned in a certain direction which created some operational difficulties. If one car was defective then the whole string had to go into the shop. These tanker cars were all shipped to the Southern Pacific and later converted to the Oil Can train that went from central California, over Techachapi Pass, to Carson in the Los Angeles basin. One train of about 72 cars originated in a terminal in Mojave each day and was sent to the Unocal (now Tosco) oil refinery in Carson, Calif. Also in 1996, Mobil Oil began shipping crude oil from San Ardo on Southern Pacific's Coast Line to the Mobil oil refinery in Torrence, where it was unloaded in Carson and further transported by pipeline to Torrence.

CN (Canadian National) has been handling tanker trains on a regular basis since the late 1990's in the province of Quebec, Canada. There, 2 unit trains per day are operated wherein each train has about 68 cars comprised of 4 strings of about 17 cars. One loaded train is dispatched from St-Romuald Quebec to Montreal-East and at the same time 1 empty train returns from Montreal-East to St-Romuald. A third train with 3 strings is also operated every 2 days from St-Romuald to Maitland Ontario and then returned. This train leaves St-Romuald with 4 strings of 17 cars, dropping 1 string in Quebec City where it goes on a regular train from Chatham New Brunswick.

FIG. 1 is a graph of bitumen viscosity as a function of temperature. The bitumen has an API rating from about 6 API to about 14 API which covers the range of API ratings for most of the bitumen recovered from the McMurray oil sands of the Athabasca in Alberta. This data is prior art and was taken from US Patent Application 2010/276,140. As can be seen the viscosity of heated bitumen is less than about 10 centipoise at a temperature of about 23° C. to about 24° C. At this viscosity, the melted bitumen would flow much like water and therefore can be readily pumped into and out of a string of tanker cars as well as into a short pipeline to a refinery or tanker ship.

Figure 2:
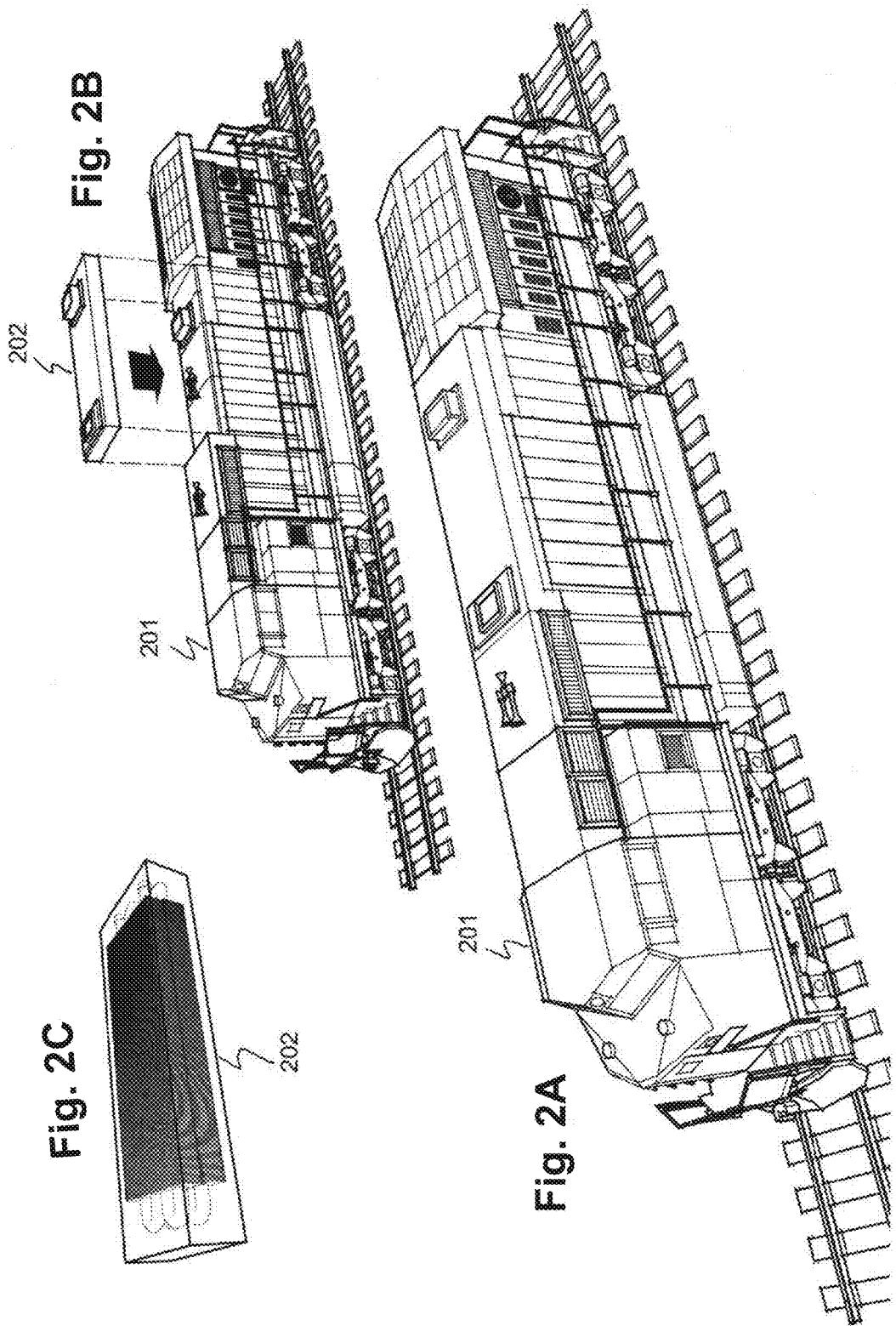
FIG. 2A illustrates a locomotive.
FIG. 2B illustrates the locomotive of FIG. 2A wherein a heat exchanger is visible.
FIG. 2C illustrates a heat exchanger.

FIGS. 2A-2C show a locomotive with a large heat exchanger mounted on the locomotive. FIG. 2A shows a schematic of a typical diesel locomotive 201. FIG. 2B shows a typical diesel locomotive 201 with a large heat exchanger 202 mounted on its roof. FIG. 2C shows an example of a large heat exchanger 202 in more detail.

A disadvantage of transporting dilbit is that the diluent takes up from about 20% to about 30% of the volume of each tanker care. Another disadvantage of transporting dilbit is that the dilbit is liquid with a viscosity not much higher than water at outside ambient temperatures. Therefore, in the event of a train derailment and rupture of some or all of the tanker cars, the spill of dibit remains liquid and must be treated as a major oil spill.

If heavy hydrocarbons is transported without diluent but in a heated condition, its temperature can be controlled, allowing it to be transported as either a solid (in the case of bitumen) or as a viscous liquid just above its freezing point. Therefore, in the event of a train derailment and rupture of some or all of the tanker cars, the heavy hydrocarbons will soon freeze and become solid or semi-solid, depending on ambient temperature. Although it may be classed as an oil spill, it will be much easier to clean up as it will be a solid or at worst a very viscous material that will not disperse rapidly as would dilbit.

Figure 3:
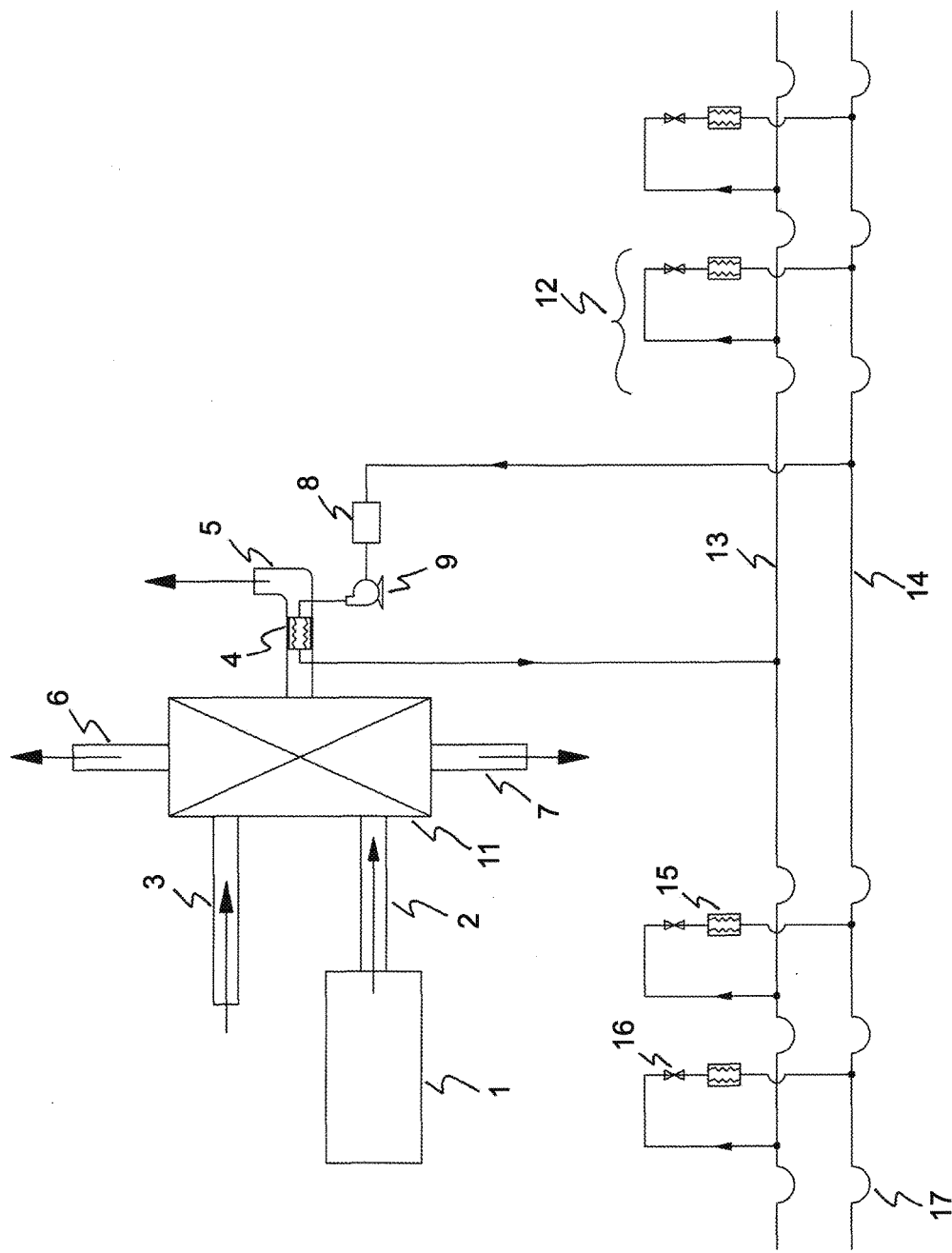
FIG. 3 shows a schematic of a possible heat transfer flow circuit of the present disclosure.

FIG. 3 shows a schematic of a possible heat transfer flow circuit for a heavy hydrocarbon temperature control system. A locomotive engine 1 emits an exhaust stream through exhaust stack 2 and into a flow switch apparatus 11. There is also an air scoop 3 typically located on top of the locomotive which directs cool air into a flow switch apparatus 11. Flow switch apparatus 11 allows the engine exhaust to be directed either across heat exchanger 4 or out exhaust stack 7 into the atmosphere. Flow switch apparatus 11 also allows the cool air stream to be directed either across heat exchanger 4 or out exhaust stack 6 into the atmosphere. When heating of the heavy hydrocarbons in tanker cars is selected, flow switch apparatus 11 directs engine exhaust gas across heat exchanger 4 and the cool incoming air back out exhaust stack 6 into the atmosphere. When cooling of the heavy hydrocarbons in tanker cars is selected, flow switch apparatus 11 directs cool air stream across heat exchanger 4 and the engine exhaust out exhaust stack 7 into the atmosphere. A primary heat exchanger 4 or exchangers are located in the flow path of the gases directed through the heat exchanger by the flow switch apparatus 11. When heating of the heavy hydrocarbons in tanker cars is selected, heat energy is transferred from the hot exhaust to a heat transfer fluid such as, for example, water, water and propylene glycol or other well-known heat transfer fluid. The heat transfer fluid is circulated throughout the heat distribution system by a pump 9. The heated heat transfer fluid flows via path 13 to the individual tanker cars. When cooling of the heavy hydrocarbons in tanker cars is selected, heat energy is transferred from the heat transfer fluid to the cool air flow. In this case, the cooled heat transfer fluid is also circulated throughout the tanker car distribution system by pump 9. The cooled heat transfer fluid flows via path 13 to the individual tanker cars.

Each tanker car is represented by a circuit 12 comprised of at least a control valve 16 and a heat exchanger 15. Each tanker car is delineated by connections 17 which represent connections between tanker cars. As described below, each tanker car senses the temperature, by one or more temperature sensors, of its heavy oil or bitumen cargo and determines whether the temperature is within a desired range (e.g., above a selected temperature threshold, as defined by a look up table of sensed temperatures, etc.). When the heavy hydrocarbons temperature is below the desired range, flow switch apparatus 11 directs engine exhaust gas across heat exchanger 4 and heat energy is transferred from the hot exhaust to a heat transfer fluid. Control valve 16 allows an amount of heat transfer fluid into the tanker car heat exchanger 15, removing heat from the heat transfer fluid and raising the temperature of the heavy hydrocarbon cargo until it is within a desired range. The heat transfer fluid returns via path 14 and is first directed to surge/overflow reservoir 8 before being pumped by pump 9 back through the primary exhaust stack heat exchanger 4. The advantage of this method of maintaining or increasing the temperature of the heavy hydrocarbon cargo is that the waste engine exhaust heat energy is utilized rather than being discarded by venting to the atmosphere. In addition, the exhaust of the present disclosure, when used for heating the heavy hydrocarbon cargo, is vented to the atmosphere at a substantially lower temperature and therefore somewhat less harmful to the environment.

When the heavy hydrocarbon temperature is above the desired range, flow switch apparatus 11 directs cool air stream across heat exchanger 4 and heat energy is extracted from the heat transfer fluid to the cooler air flow. Control valve 16 allows an amount of heat transfer fluid into the tanker car heat exchanger 15, removing heat from the heavy hydrocarbons to the heat transfer fluid and lowering the temperature of the heavy hydrocarbon cargo until it is within a desired range. The heat transfer fluid returns via path 14 and is first directed to surge/overflow reservoir 8 before being pumped by pump 9 back through the primary exhaust stack heat exchanger 4. The advantage of this method of lowering the temperature of the heavy hydrocarbon cargo is that the cool air scooped from the atmosphere is utilized by the same heat exchanger 4, heat transfer fluid and flow circuit and the same tanker car heat exchange and control circuit as those used in maintaining or increasing the temperature of the heavy hydrocarbon.

As can be appreciated the cooling air may be scooped from the atmosphere or it may be drawn into the air flow duct by a large fan or fans.

Typically the heavy hydrocarbon is heated so that it can flow via suitable hose or pipe for loading at the well head. Therefore, the method of the present disclosure is primarily designed to maintain the loaded cargo within a selected temperature range. The method can also be used to heat the cargo from a low temperature back to within the desired range should that be necessary. This would require running the locomotives for several days to a week or more, depending on how low the cargo temperature was. Such a capability could be necessary if the heat transfer system malfunctions or the train were to be parked, for example, in an emergency.

Figure 4:
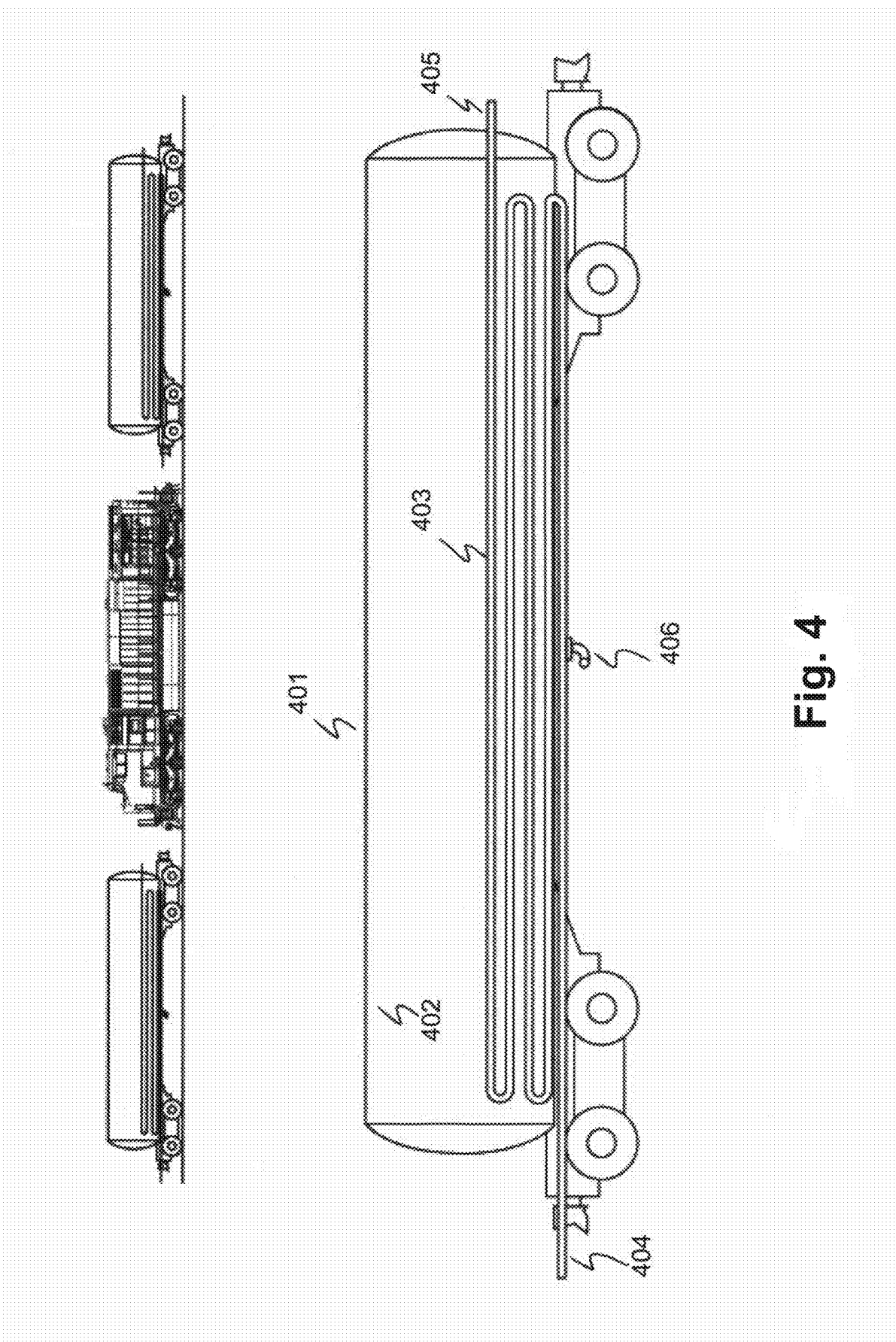
FIG. 4 is a schematic of a heated tanker car of the present disclosure.

FIG. 4 is a schematic of a heated tanker car of the present disclosure. Typically each locomotive in the unit train consist will be separated by a string of about 20 to about 40 tanker cars. Each tanker car 401 is comprised of an insulated steel tank 402 mounted on two truck assemblies. The heat exchanger coils 403 may be attached to the outer steel tank between the tank and its insulation. The heat exchanger coils 403 may also be immersed in the heavy hydrocarbon cargo. The former location outside the tanker shell may be preferable as coils immersed in the heavy hydrocarbon could be lost if the heavy hydrocarbon were heavy hydrocarbons and the coils malfunctioned. The heat transfer fluid enters the tanker car conduit system through a connection 404 and exits through a connection 405. The return conduit is not shown. An emergency drain 406 is also shown. Other configurations of heat exchangers may be considered. As noted above, this configuration of heat exchanger coils is suitable for heating or cooling the hydrocarbon cargo in the tanker car.

Further Description of the Heat Transfer Circuit.

As mentioned previously, the technology involving the moving of thermal energy from the hot locomotive engine exhaust from the locomotive to the heavy hydrocarbon cargo, to a block of specifically connected tanker cars is conceptually straightforward. This is accomplished by the hot exhaust passing through a primary heat exchanger that heats a thermal fluid that circulates through heat exchangers associated with each tanker car, thereby delivering heat energy into the heavy crude oil or heavy hydrocarbons.

The heat transfer fluid can be a variety of liquids that remain liquid around the thermal energy circuit, absorbing and releasing sensible heat. Or the heat transfer fluid can be a liquid that changes state when heated, going from a liquid to a vapor and when cooled, going back to a liquid. In the changing of state of the heat transfer fluid, most of the thermal energy is transferred by way of latent heat of the fluid. A practical example of this method of this heating is steam heating utilizing a Rankine cycle.

Whether the heat transfer fluid remains a liquid or changes to a vapor and back to a liquid as it passes around the heat transfer circuit, the motive power necessary to move the fluid is supplied by a pump. The pump and its driver, possible powered as an auxiliary from the locomotive, along with a reservoir or reservoirs for the heat transfer fluid would typically be located on the locomotive. For a simple heating loop, the heat transfer fluid remains a liquid and a reservoir or reservoirs would provide space for an expanding volume of heat transfer fluid as it heats up. These reservoir or reservoirs would provide for make-up caused by leaks in the heat transfer system. The steam heating system would require a reservoir for the returning condensate often referred to as a "hot well" and a make-up supply to replace water lost in the system through leaks.

As can be appreciated, the amount of energy to pump the heat transfer fluid around the heat exchange circuit is substantially less than the amount of energy that would be required to heat or cool a heavy hydrocarbon cargo to a desired temperature.

If cooling of the heavy hydrocarbon cargo is selected, auxiliary power would be required to operate fans used to drawn into the air flow duct and to operate the pump to circulate the heat transfer fluid around the tanker car heat exchange circuit. Cooling of the heavy hydrocarbon cargo is also assisted by heat loss from the tanker cars when the cargo is at a higher temperature than the outside ambient temperature.

Description of Control Strategy

As mentioned previously, the two control concerns are controlling the temperature of heavy hydrocarbon in the tanker cars for acceptable handling at the receiving terminal and the rationing or allotting of the thermal energy between the tanker cars in thermal circuit because of the finite thermal energy resource.

To control the maximum temperature of the thermal transfer fluid and heat input to the thermal energy circuit from the locomotive exhaust a damper or valve in the locomotive exhaust stream would proportionally control the amount of locomotive exhaust that goes through the heat exchanger or bypasses it. This damper could be a hinged metal flap that would be actuated by a servomechanism and ultimately controlled by temperature sensor and computer logic with additional sensors.

The control strategy for sharing the thermal energy between the tanker cars would involve control valves on all of the tanker cars. Because the tanker cars are essentially in parallel with respect to the thermal transfer fluid circuit, the opening and closing of the control valves can preferentially direct the flow of the thermal energy to different tanker cars. This ability to control the heat flow would compensate for the placement of the tanker cars in circuit with the most distance tanker cars, at the "end of the string", otherwise receiving a lower flow and temperature of the heat transfer fluid.

Temperature and Heating Capacity Requirements for the Tanker Cars

Ideally to efficiently utilize the thermal energy resource from the locomotive exhaust heat exchanger, both temperature and capacity need to satisfy the heating requirements of keeping the heavy hydrocarbon in the tanker cars at an acceptable viscosity. Information presented in a paper on pumping hot bitumen through a heat pipeline discusses the practical limit that hot bitumen, for example, can cool and still flow. That limit is about 90 degrees C. Handling of bitumen often called asphalt is usually done at much higher temperatures than the 90 degrees C. Temperatures between about 125 to about 200 degrees C. are typically required to maintain the required viscosity in asphalt plants and oil refinery for piping, pumping and storing bitumen. Considering severe cold weather, a reasonable temperature for maintaining bitumen at, for example, say 150 degrees C. and the insulation quality (as described by its K factor) of the tanker cars the heat loss from the tanker cars can be calculated. Knowing the heat loss, the heating capacity can be estimated to determine if the heat input will adequately compensate for the heat loss and maintain the desired temperature and viscosity of bitumen. The shell of tank of a selected example of tanker car is calculated at 1,885 sq. ft. (10 foot diameter by 55 feet long.). The K factor is from the Federal Code of Regulation (F.C.R.) for the US Department of Transportation concerning the construction of insulated tanker railcars.

The K factor is 0.075 Btu per hour per square foot per degree Fahrenheit (F). The area of the tanker car is about 1,885 square feet and the maximum delta temperature is about 300 degrees F. This results in a power loss of thermal energy of about 42,500 Btu per hour or about 12.5 kW.

The heat loss at 0 degrees F. of a 300 degree F. differential is representative of severe Alberta winter conditions and would require the input of about 42,500 Btu per hour or about 12.5 kW to maintain the example tanker car at the desired temperature. At ISO condition of 15 degrees C. (59 degrees F.), the tanker car would require about 34,100 Btu per hour or about 10 kW. For the locomotive heat source, the average thermal energy output, to take into account for severe temperature conditions, would need to be in excess of about 1.7 million Btu per hour or about 500 kW for the 40 tanker cars connected by way of a thermal circuit. The temperature the heat transfer fluid would need to be well in excess of 300 degrees F. to transfer heat into the 300 degree F. bitumen.

The thermal power of the exhaust of a 4,500 HP locomotive engine is about equal to the shaft power output. Thus the thermal power of the exhaust is about 600 kW (engine at about 60% maximum power during level operation) so there is more than enough thermal energy to heat the heavy hydrocarbon cargo even allowing for losses.

Heavy Hydrocarbon Train Consist

Because the large amount of heavy crude or bitumen that can be shipped by rail and the resultant economic savings of assembling a whole train of bitumen filled tanker cars at one point and sending it to a single destination, the "unit train" model is the best practice. A heavy crude or bitumen unit train containing about 120 tanker cars, which would be considered fairly standard for a unit train in North America in terms of length and train handling, would contain about 66,000 barrels of about API 8 to about API 20 heavy crude or bitumen. The weight of this unit train would be about 16,000 tons without locomotives. Unit trains are typically dispatched with 0.5 to 1.0 horsepower per ton depending on terrain and other factors. Such a train would have 2 to about 6 modern 4,000 to 6,000 horsepower locomotives, depending on the terrain of the route.

In recent years most railroads in North America have adopted the practice of "distributed power" for their heavy large trains. With distributed power, locomotives are placed within the train separated by blocks of cars and remote control from the lead locomotive on the head end (the A-unit). Using distributed power with the bitumen unit train, the B-unit locomotives may be placed strategically in the train with blocks of tanker cars that are connected in a circuit of circulating heat transfer fluid. Breaking the bitumen train into 3 sections, for example, with blocks of about 40 tanker cars each and with a B-unit locomotive in the middle of the block of about 40 tanker cars. Or restated, the train could be described as having about 20 tanker cars on each end of the 3 B-unit locomotives. With this configuration of tanker cars and locomotives, the circuits of circulating heat transfer fluid only extend out about 20 tanker cars on beyond the ends of the 3 remote-controlled B-unit locomotives within the unit train.

Figure 5:
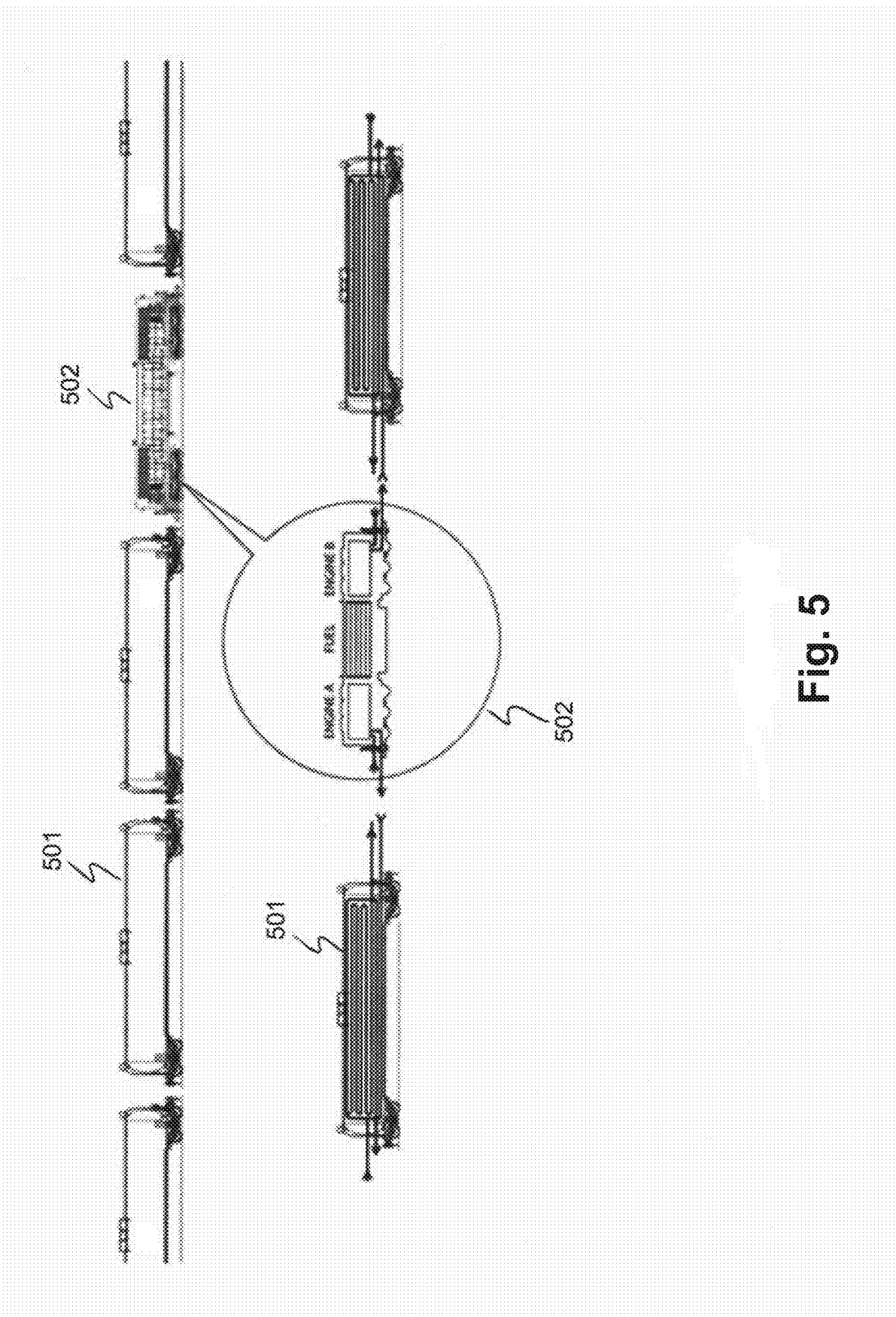
FIG. 5 illustrates elements of a bitumen train consist.

FIG. 5 illustrates elements of a bitumen train consist. The consist is typically comprised of an A-unit lead locomotive (not shown), a string of tanker cars 501 and intermediate B-unit locomotives 502. The locomotives may be conventional diesel locomotives or as highlighted in FIG. 5, a locomotive comprising two gas turbine engines on either side of a central fuel storage compartment. This highlighted locomotive could be, for example, a natural gas-powered locomotive using either liquid natural gas ("LNG") or compressed natural gas ("CNG").

Figure 6:
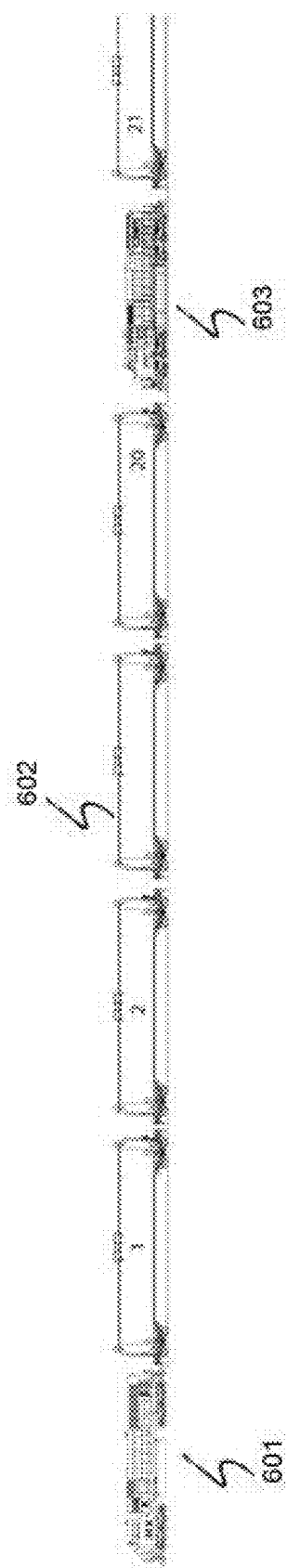
FIG. 6 illustrates a segment of a bitumen train consist.

FIG. 6 illustrates a segment of a heavy hydrocarbon unit train. The consist of FIG. 6 is comprised of an A-unit locomotive 601 and B-unit locomotives 603 where each B-unit is separated by a string of about 20 tanker cars 602. A typical heavy hydrocarbon unit train might be comprised of:
    a lead A-unit locomotive
    a first string of about 20 tanker cars
    a first B-unit locomotive
    a second string of about 20 tanker cars
    a second B-unit locomotive
    a third string of about 20 tanker cars
    a third B-unit locomotive
    a fourth string of about 20 tanker cars
    a fourth B-unit locomotive
    a fifth string of about 20 tanker cars Such a unit train would therefore be comprised of an A-unit, 4 B-units and a total of 100 tanker cars divided into 5 strings. Typically, the A-unit would not be configured with an exhaust heat exchanger. The heat transfer system would be installed on only the B-units and tanker cars. This configuration would allow the train to be assembled on a siding and then the operating railroad would provide the lead A-unit locomotive to move the train from well head to terminus.

As can be appreciated, the A-unit could also include an exhaust heat exchanger and heat transfer fluid coupling so that it too could participate in the cargo heating system.

In other configurations, the container volumes containing the hydrocarbon are structures other than tanker cars. For example, the container volumes can be a tanker truck with the truck engine being used as a source of thermal energy to heat or cool the hydrocarbon.

Temperature Control Process

As mentioned above, a disadvantage of transporting dilbit is that the diluent takes up from about 20% to about 30% of the volume of each tanker care. Another disadvantage of transporting dilbit is that the dilbit is liquid at outside ambient temperature. Therefore, in the event of a train derailment and rupture of some or all of the tanker cars, the spill of dibit remains liquid and must be treated as a major oil spill.

If bitumen, for example, is transported without diluent but in a heated condition, its temperature can be controlled allowing it to be transported as either a solid or as a liquid just above its freezing point. Therefore, in the event of a train derailment and rupture of some or all of the tanker cars, the bitumen will soon freeze and become solid or semi-solid, depending on ambient temperature. Although it may be classed as an oil spill, it will be much easier to clean up as it will be a solid or at worst a very viscous material that will not disperse rapidly as would dilbit.

Figure 7A:
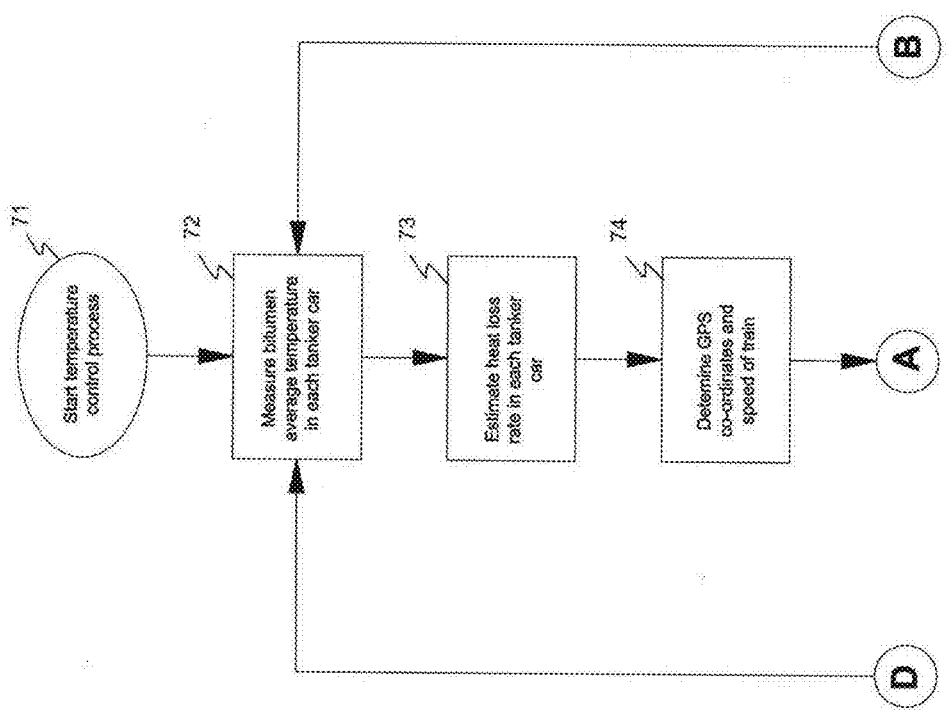
FIG. 7A illustrates a portion of a possible bitumen temperature control procedure for use during transit.
Figure 7B:
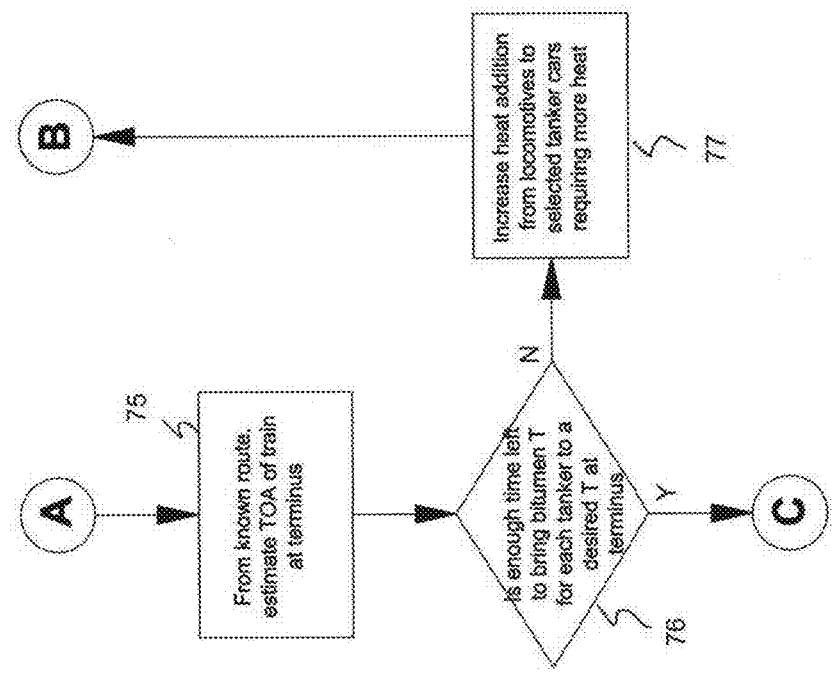
FIG. 7B illustrates a portion of a possible bitumen temperature control procedure for use during transit.
Figure 7C:
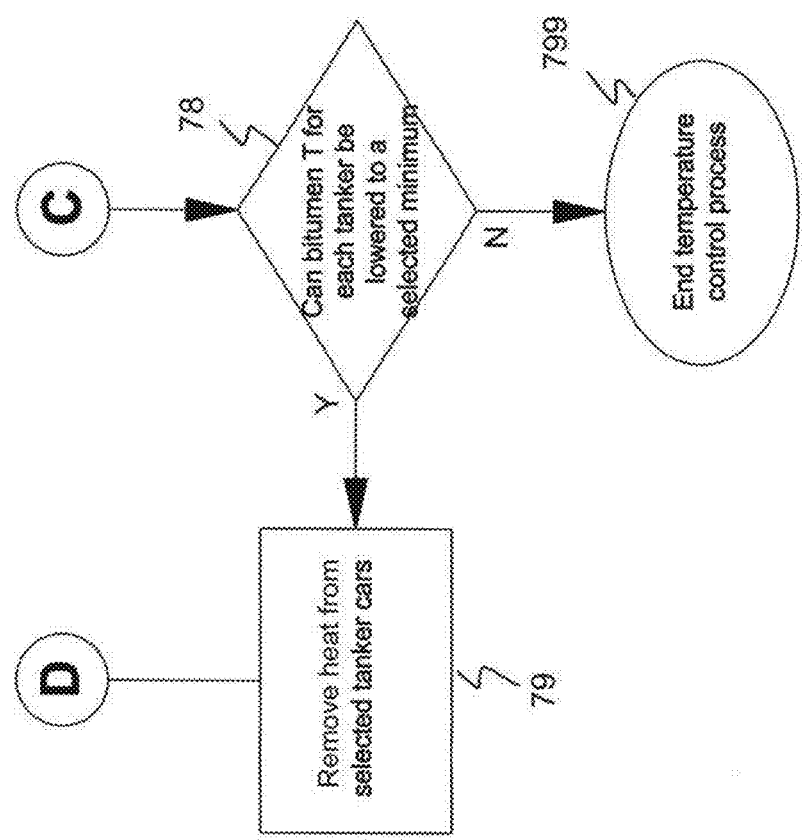
FIG. 7C illustrates a portion of a possible bitumen temperature control procedure for use during transit.

FIGS. 7A-7C illustrate a possible heavy hydrocarbon temperature control procedure for use during transit described for bitumen as an example of the heavy hydrocarbon. The bitumen temperature control process described herein allows control of the distribution of engine exhaust energy or cooling air from one of more locomotives to each of the tanker cars so that the temperature of the bitumen in each tanker car can be monitored and controlled to a selected temperature. As shown in FIGS. 7A, 7B and 7C, the process is initiated 71. The average temperature of the bitumen is measured in each tanker car 72. The mass of bitumen, thermal characteristics of the bitumen (heat capacity and viscosity versus temperature for example) and approximate heat loss characteristics of each tanker car are known and this information is stored in a computer. This information along with the measured temperature allows the rate of heat loss of each tanker care to be estimated 73. A GPS unit in any of the locomotives allows the position of the train to be determined 74. This information along with the speed of the train and its known route (which is also stored in the computer) allows the time of arrival of the train at its terminus to be estimated 75. Since the current bitumen temperature is known and the temperature required at the terminus is known, then the estimated heat loss rate and estimated time of arrival of the train can be used to determine in step 76 if the bitumen temperature can be raised to the level required for pumping at the terminus by increasing the energy delivered to the bitumen in each tanker car by the locomotive exhaust/heat exchanger system. If additional heating is required, heat addition from the locomotive exhaust/heat exchanger system can be increased 77 and the temperature control procedure returns to the beginning 71. If additional heating is not required, no further heating from the locomotive exhaust/heat exchanger system is required and the procedure continues to step 78.

In step 78, if the measured temperature of the bitumen is higher than a selected minimum value, heat can be removed 79 from the bitumen to lower its temperature and the temperature control procedure returns to the beginning 71. If the measured temperature of the bitumen at about the selected minimum value, the temperature control procedure returns to the beginning 71 and the temperature control procedure is repeated.

As described previously, heat can be added or removed from each tanker car by controlling the flow of heat transfer fluid from one or more of the locomotives in the consist.

In some of the embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In other embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Figure 8:
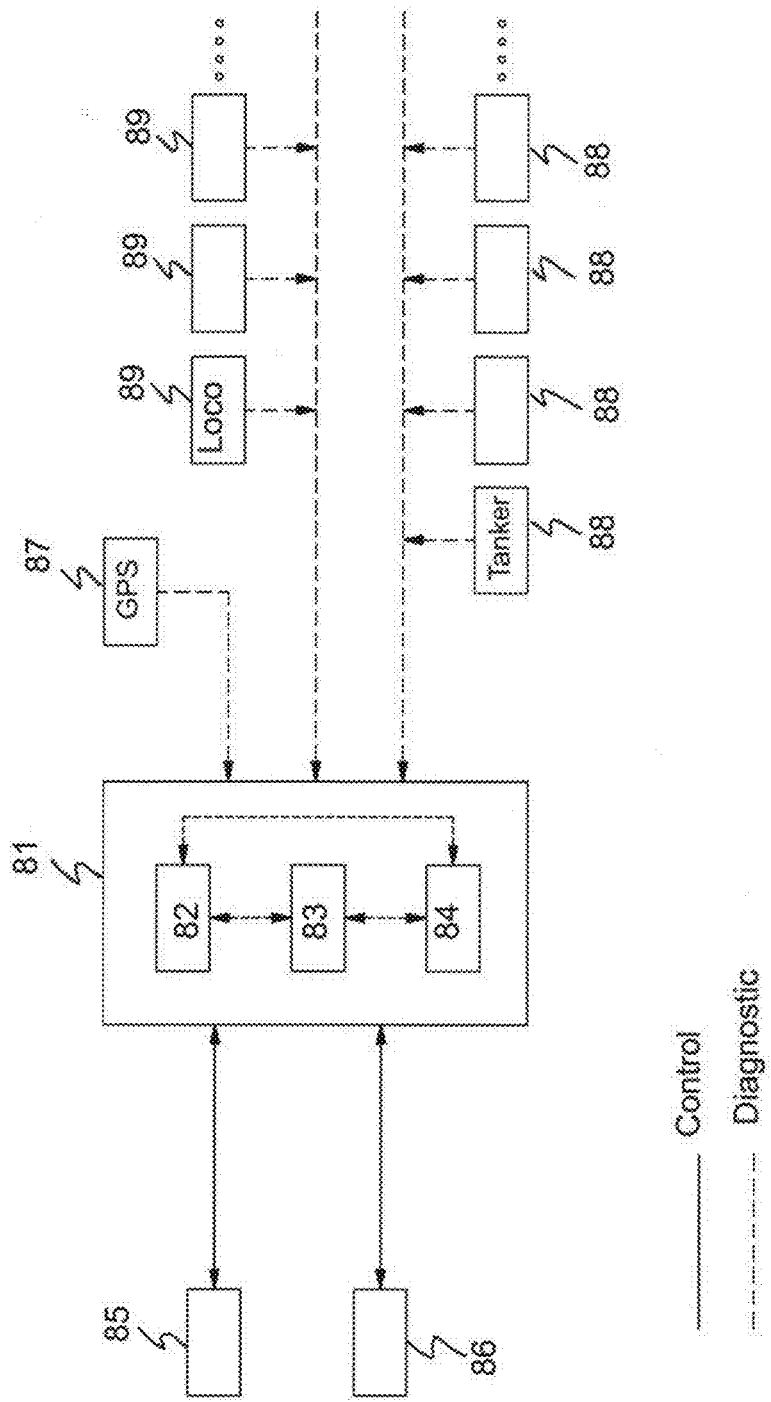
FIG. 8 is a schematic of a control and feedback system for applying the bitumen temperature control procedure.

FIG. 8 is a schematic of a control and feedback system for applying the bitumen temperature control process to each tanker car in a consist of a plurality of tanker cars and at least one locomotive with a heat exchanger for capturing heat energy from the exhaust of the at least one locomotive's engine or engines.

Manual or computer-automated monitoring of locomotive exhaust/heat exchanger system diagnostics, train GPS and speed diagnostics, and tanker car temperature diagnostics provides the feedback for adjusting control of heat exchanger fluid flow to the individual tanker cars. This figure illustrates the important functional units of a bitumen temperature control system and process. FIG. 8 shows locomotive or locomotives exhaust/heat exchanger system diagnostics 89, train GPS and speed diagnostics 87 and tanker car temperature diagnostics 88 which communicate with computer 81 via paths indicated by dashed lines. Computer 81 controls the locomotive exhaust gas/cooling air heat exchanger systems 85 and the tanker car heat removal systems 86 via paths indicated by solid lines. Computer 81 is comprised of a memory module 82, a processor module 83 and a controller 84. The controller 84 contains control logic electronics used, among other things, to process diagnostic data collected from the aforementioned diagnostics and to provide control inputs for the control elements. In one embodiment, the controller utilizes control algorithms comprising at least one of on/off control, proportional control, differential control, integral control, state estimation, adaptive control and stochastic signal processing.

The exemplary systems and methods of this disclosure have been described in relation to preferred aspects, embodiments, and configurations. Modifications and alterations will occur to others upon a reading and understanding of the preceding detailed description. It is intended that the disclosure be construed as including all such modifications and alterations insofar as they come within the scope of the appended claims or the equivalents thereof. To avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

What is claimed is:

1. A method, comprising:
controlling, in a first mode and a second mode, a temperature of a hydrocarbon contained in one or more container volumes during transport using at least one of an engine exhaust gas provided by an engine causing the transport of the one or more container volumes and ambient air to exchange thermal energy with a heat exchange fluid contacting the one or more container volumes such that the temperature of the hydrocarbon in the one or more container volumes is maintained at a selected temperature during transport,
wherein the controlling includes:
determining an average temperature of the hydrocarbon in each of the one or more container volumes;
estimating a rate of heat loss for each of the one or more container volumes based on the average temperature for each of the one or more container volumes, a mass of the hydrocarbon in each of the one or more container volumes, heat loss characteristics of each of the one or more container volumes and thermal characteristics of the hydrocarbon;
determining a position of the one or more container volumes relative to a destination of the transport; and
controlling the temperature of the hydrocarbon to be raised or lowered in each of the one or more container volumes based on the rate of heat loss and the position,
wherein, in the first mode, the controlling controls the selected temperature such that the hydrocarbon maintains a first state, and
wherein, in the second mode, the controlling controls the selected temperature such that the hydrocarbon maintains a second state, different from the first state.

2. The method of claim 1, wherein the engine exhaust gas and the heat exchange fluid raise the temperature of the hydrocarbon contained in the one or more container volumes and the ambient air and the heat exchange fluid lower the temperature of the hydrocarbon contained in the one or more container volumes.

3. The method of claim 1, wherein the temperature of the hydrocarbon contained in the one or more container volumes is maintained by an automatic controller configured to manipulate a control valve to contact selectively the heat exchange fluid with at least one of the one or more container volumes and the hydrocarbon.

4. The method of claim 1, wherein the one or more container volumes are each railway tanker cars and wherein the engine is in a locomotive connected to the one or more container volumes.

5. The method of claim 1, wherein the at least one of the engine exhaust gas and the ambient air is in fluid communication with a locomotive heat exchanger through which the heat exchange fluid flows.

6. The method of claim 4, wherein the one or more container volumes comprise a conduit for the heat exchange fluid, wherein the one or more container volumes comprise multiple tanker cars, and wherein the conduit extends from one tanker car to an adjacent tanker car.

7. The method of claim 6, wherein each of the railway tanker cars comprises a tanker car heat exchanger and a heat transfer control valve and wherein the tanker car heat exchanger is selectively contacted with the heat exchange fluid, whereby the hydrocarbon is heated and cooled, respectively, by thermal contact with the heat exchange fluid.

8. The method of claim 1, wherein one of water, water and propylene glycol and DOWTHERM is the heat exchange fluid, wherein the heat exchange fluid is in thermal communication with a locomotive heat exchanger on a railway locomotive and is routed through one or more conduits to the one or more container volumes to raise or maintain a user-selected temperature of the hydrocarbon in the one or more container volumes.

9. The method of claim 1, wherein, while the hydrocarbon is stored in the one or more container volumes, the one or more container volumes is substantially free of diluents.

10. The method of claim 1, wherein the hydrocarbon in the first state is in a solid state or semi-solid state achieved by cooling the heat exchange fluid with the ambient air,
wherein the hydrocarbon in the second state is in a liquid state achieved by heating the heat exchange fluid with the engine exhaust gas.

11. A system for controlling a temperature of a hydrocarbon during transport comprising:
a hydrocarbon contained in one or more container volumes configured for transport;
an engine causing the transport of the one or more container volumes, the engine producing an engine exhaust gas; and
a controller to control, in a first mode and a second mode, the temperature of the hydrocarbon to be maintained during transport at a selected temperature using at least one of the engine exhaust gas provided by the engine causing the transport of the one or more container volumes and ambient air to exchange thermal energy with a heat exchange fluid in thermal communication with the one or more container volumes,
wherein the controller:
determines an average temperature of the hydrocarbon in each of the one or more container volumes;
estimates a rate of heat loss for each of the one or more container volumes based on the average temperature for each of the one or more container volumes, a mass of the hydrocarbon in each of the one or more container volumes, heat loss characteristics of each of the one or more container volumes and thermal characteristics of the hydrocarbon;
determines a position of the one or more container volumes relative to a destination of the transport; and
controls the temperature of the hydrocarbon to be raised or lowered in each of the one or more container volumes based on the rate of heat loss and the position,
wherein, in the first mode, the controller controls the selected temperature such that the hydrocarbon maintains a first state, and wherein, in the second mode, the controller controls the selected temperature such that the hydrocarbon maintains a second state, different from the first state.

12. The system of claim 11, wherein the engine exhaust gas and the heat exchange fluid raise the temperature of the hydrocarbon contained in the one or more container volumes and the ambient air and the heat exchange fluid lower the temperature of the hydrocarbon contained in the one or more container volumes.

13. The system of claim 11, wherein the temperature of the hydrocarbon contained in the one or more container volumes is maintained by an automatic controller configured to manipulate a control valve to contact selectively the heat exchange fluid with at least one of the one or more container volumes and the hydrocarbon.

14. The system of claim 11, wherein the one or more container volumes are each railway tanker cars and wherein the engine is in a locomotive connected to the one or more container volumes.

15. The system of claim 11, wherein the at least one of the engine exhaust gas and the ambient air is in fluid communication with a locomotive heat exchanger through which the heat exchange fluid flows.

16. The system of claim 14, wherein the one or more container volumes comprise a conduit for the heat exchange fluid, wherein the one or more container volumes comprise multiple tanker cars, and wherein the conduit is extends from one tanker car to an adjacent tanker car.

17. The system of claim 16, wherein each of the railway tanker cars comprises a tanker car heat exchanger and a heat transfer control valve and wherein the tanker car heat exchanger is selectively contacted with the heat exchange fluid, whereby the hydrocarbon is heated and cooled, respectively, by thermal contact with the heat exchange fluid.

18. The system of claim 11, wherein the one or more container volumes are each railway tanker cars and wherein the engine is in a locomotive connected to the one or more container volumes; wherein one of water, water and propylene glycol and DOWTHERM is the heat exchange fluid, and wherein the heat exchange fluid is in thermal communication with a locomotive heat exchanger of the railway locomotive and is routed through one or more conduits to the one or more container volumes to raise or maintain a user-selected temperature of the hydrocarbon in the one or more container volumes.

19. The system of claim 11, wherein while the hydrocarbon is stored in the one or more container volumes, the one or more container volumes is substantially free of diluents.

20. The method of claim 10, wherein the controlling includes operating in the first mode if the one or more container volumes are beyond a threshold distance from the destination of the transport, and wherein the controlling includes operating in the second mode if the one or more container volumes are within the threshold distance from the destination.

* * * * *